United States Patent [19]

Runyan

[11] 4,099,705
[45] Jul. 11, 1978

[54] END ENTRY BALL VALVE WITH SEAL WEAR COMPENSATION AND FORCE ISOLATED SEAL

[75] Inventor: Gary L. Runyan, Louisville, Ky.

[73] Assignee: Celanese Corporation, New York, N.Y.

[21] Appl. No.: 715,795

[22] Filed: Aug. 19, 1976

[51] Int. Cl.$^2$ ............................................. F16K 5/06
[52] U.S. Cl. .................................. 251/171; 251/172; 251/315
[58] Field of Search ............... 251/315, 172, 174, 175, 251/171

[56] References Cited

U.S. PATENT DOCUMENTS

| | | | |
|---|---|---|---|
| 3,214,135 | 10/1965 | Hartmann | 251/315 |
| 3,266,769 | 8/1966 | Shand | 251/315 X |
| 3,323,542 | 6/1967 | Magos | 251/315 X |
| 3,508,736 | 4/1970 | Rhodes | 251/172 |
| 3,550,902 | 12/1970 | Pidgeon | 251/315 X |

FOREIGN PATENT DOCUMENTS 1,403,712  8/1975  United Kingdom ................ 251/315

Primary Examiner—Alan Cohan

[57] ABSTRACT

In an end entry ball valve assembly, a bifurcated seal carrier comprised of an annular seal support member and back-up member, is received in at least one end opening. The seal support member includes an axially facing end wall and a radially facing guide wall. The back-up member is slidably received in the opening and presents a recess defined by an axially facing support wall and a radially facing guide wall respectively adjacent the end wall and guide wall of the seal support member. An annular, resilient biasing and sealing ring is disposed, in a radially tensioned and axially compressed condition, in a groove disposed in at least one of those axially facing walls at a location radially inwardly of the guide walls. The ring biases the seal support member and a seal carried thereby toward the valve ball and seals against fluid flow between the axially facing walls. The seal support member is dimensioned for limited radial centering movement in the receiving recess without direct compressive resistance by the biasing and sealing ring. Longitudinal loads on the back-up member are isolated from the valve ball.

8 Claims, 5 Drawing Figures

END ENTRY BALL VALVE WITH SEAL WEAR COMPENSATION AND FORCE ISOLATED SEAL

BACKGROUND OF THE INVENTION

This invention relates generally to ball valves. More particularly, this invention relates to thermoplastic ball valves of the end entry type.

End entry type ball valves have well recognized advantages from the standpoint of manufacturing and assembly. In known thermoplastic end entry ball valves, such as the type shown in U.S. Pat. No. 3,550,902, additional advantages are offered by the provision for adjusting the parts of the assembly when wear occurs upon the seals.

While compensation for wear is desirable, control over the contact relationship between the seal member and ball is also an important factor. This relationship can be affected by operating conditions as well as by assembly operations.

For example, external forces generated by thermal expansion or contraction, piping misalignment, and initial positioning of the seal member can all, in the absence of precision tolerances, materially affect the sealing relationship. With thermally induced expansion, the seal members can be pushed very tightly against the valve ball, and perhaps result in undesirably high operating forces and/or marring of the ball. Thermally induced contraction can result in loss of the seal. Excessive tightening of the seal member against the ball during assembly or misalignment of the desired assembled relationship of the seal member and ball can lead to permanent deformation of the seal member itself and other undesirable problems.

OBJECTS AND SUMMARY OF PREFERRED FORMS OF THE INVENTION

It is a general object of the present invention to provide a novel ball valve that retains the manufacturing and assembly advantages of end entry design while providing compensation for wear upon the seals and establishing control over the contact relationship between a seal member and the ball.

It is a particular object of the present invention to provide such a novel ball valve of the thermoplastic type.

It is a further object of the present invention to provide such a novel ball valve wherein contact between the seal member and the ball is controlled by isolating longitudinal forces resulting from operating conditions and induced by assembly.

It is another object of the present invention to provide such a novel ball valve wherein contact between the seal member and the ball is controlled by providing for self-adjusting alignment of the seal member with respect to the ball.

Preferred embodiments of the invention intended to accomplish the foregoing and other objects comprise an end entry ball assembly including a thermoplastic valve body presenting first and second open ends and operable to be connected in fluid communicating relationship to conduits. The valve body includes a valve chamber between the first and second ends and a stem receiving passage communicating with the valve chamber. A thermoplastic valve ball is positioned in the valve chamber. The valve ball is operable to rotate in the chamber between a flow permitting position and a flow blocking position. A thermoplastic stem extends through the stem receiving passage and is engageable with the valve ball to rotate the ball between the flow permitting and flow blocking positions.

The opening of at least one end of the valve body is sufficiently enlarged for insertion of the valve ball means into said valve chamber. A thermoplastic, bifurcated seal carrier is received in at least one end of the valve body. The bifurcated seal carrier includes an annular seal support member and a back-up member.

An end connector operable to couple the ball valve assembly to a conduit at that end of the valve body is operable to transmit longitudinal loads to the back-up member. Means on the valve body isolates longitudinal loads on the back-up member from the valve ball.

In one preferred form of the invention the end connector and the back-up member are integral, and the load isolating means comprises a radially extending flange of the end connector which is solvent welded against an abutment surface of the valve body.

In another preferred form of the invention, the back-up member may be integral or separate from the end connector, but in either case it includes a leading portion of smaller external diameter and a trailing portion of enlarged external diameter to define a stepped abutment surface. The load isolating means comprises an internal shoulder of the valve body which is cooperable with the stepped abutment surface to isolate the longitudinal loads. An interiorly threaded union nut, engageable with exterior threads of the valve body means and a flange of the end connector, is operable to impose longitudinal loads on the end connector. An annular member seals between the leading portion of said back-up member and the valve body forward of the abutment surface.

The annular seal support member carrier an annular thermoplastic seal member engaged with the valve ball. The seal support member includes an axially facing end wall and a radially facing guide wall.

The back-up member is slidably receivable in the opening of one end of the valve body. The back-up member in that location presents a seal support member receiving recess defined by an axially facing support wall adjacent the axially facing end wall of the seal support member and a radial facing guide wall adjacent the radially facing guide wall of the seal support member.

An annular retaining groove is disposed in at least one of the axially facing walls. The retaining groove is located radially inwardly from the radially facing guide walls of the support member and the back-up member.

An annular, resilient biasing and sealing ring is disposed in the retaining groove in axially compressed condition. The ring generally axially biases the seal support member and the seal carried thereby toward the valve ball and seals against flow between the axially facing walls of the annular seal support member and the recess. The ring, in its relaxed condition, has an internal diameter smaller than the internal diameter of said groove and is received therein in tensioned condition.

The seal support member is dimensioned for limited radial centering movement in the receiving recess without direct compressive resistance by the resilient biasing and sealing ring.

Other objects and advantages of the present invention will become apparent from the subsequent detailed description of preferred embodiments in conjunction with the accompanying drawings in which:

THE DRAWINGS

DETAILED DESCRIPTION

Figure 1:
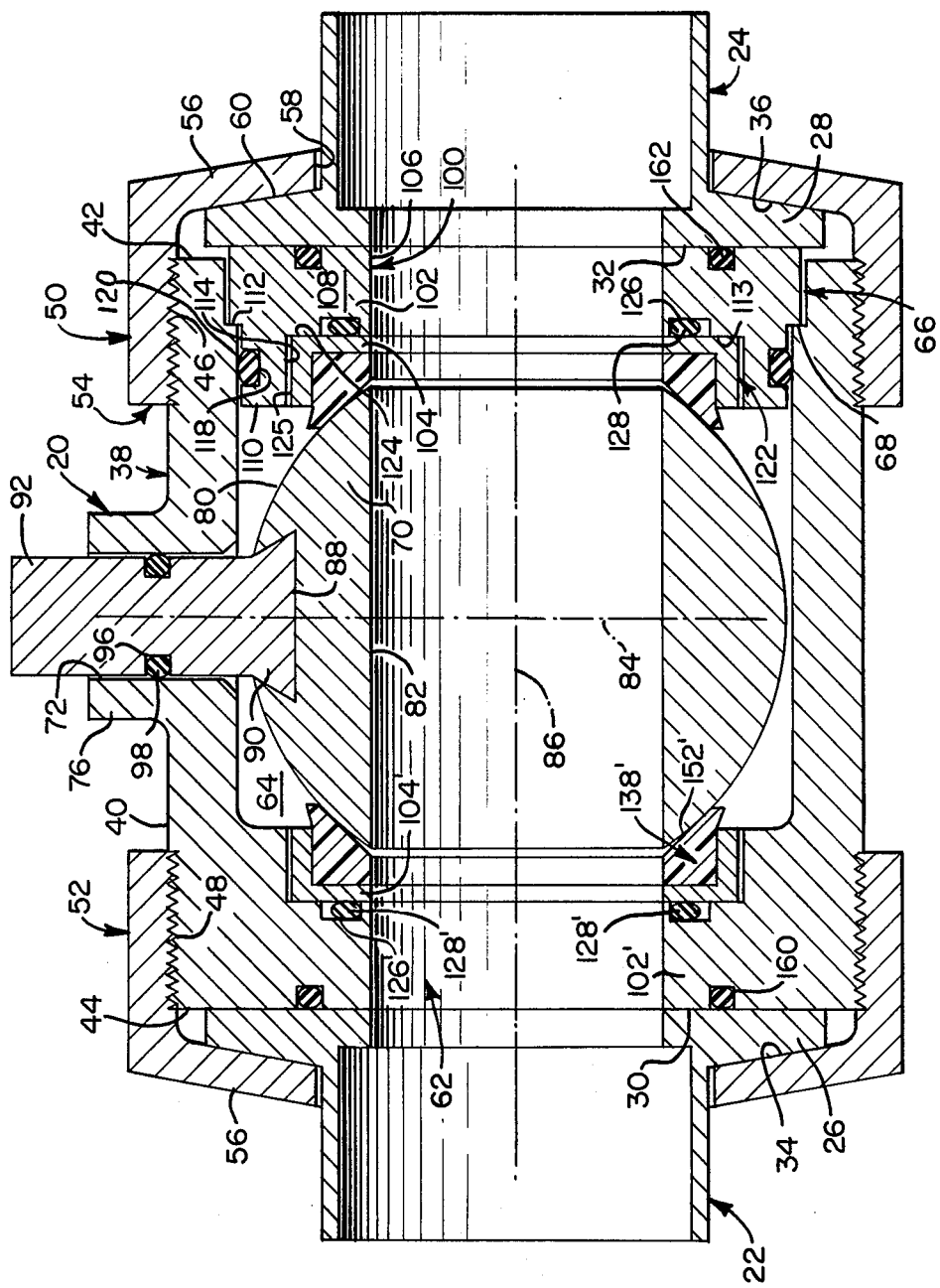
FIG. 1 is a longitudinal cross-sectional view of a thermoplastic ball valve assembly according to the present invention, the ball being depicted in its flow permitting position.

Depicted in FIG. 1 is an end entry ball valve assembly 20 constructed in accordance with a preferred embodiment of the present invention. The ball valve assembly 20 is adapted for connection in general longitudinal alignment with a pair of fluid conduits (not shown) by means of conventional end connectors 22, 24. The end connectors are respectively provided with generally radially outwardly extending flanges 26, 28. Each flange 26, 28 has a substantially radial face 30, 32 and a frustoconical surface 34, 36 which tapers radially inwardly and away from the radial face 30, 32.

The ball valve assembly 20 includes an open-ended, main valve body portion 38 which is fabricated of a corrosion-resistant thermoplastic material such as polyvinylchloride (hereinafter PVC). The main valve body portion includes a generally cylindrical external surface 40 which extends from a first generally radial end face 42 to a second generally radial end face 44. Each end of the external surface 40 is provided with an externally threaded end portion 46, 48. Union nuts 50, 52 cooperate with the threaded end portions 46, 48.

The substantially identical union nuts 50, 52 each include a cylindrical portion 54 that is internally threaded for connection to the corresponding threaded end portion 46, 48 of the main valve body portion 38. Extending radially inwardly from one end of the cylindrical portion 54 is a flange 56 which presents a central opening 58 adapted to slide longitudinally on the outer circumference of the corresponding end connectors 22, 24.

The flanges 56 (FIG. 1) each include an internal frustoconical surface 60 that tapers radially inwardly and away from the main valve body portion 38 so that it corresponds to the adjacent one of frustoconical surfaces 34, 36 of the end connector flanges 26, 28. Accordingly, when the union nuts 50 are tightened onto the main valve body portion 38, the radially extending flange 56 imposes longitudinal forces on the end connectors 22, 24.

The open-ended, main valve body portion 38 is provided with a longitudinally extending passage 62 which extends therethrough from the first radial end face 42 to the second generally radial end face 44. The illustrated longitudinally extending passage 62 includes a plurality of axially extending, generally cylindrical sections of diverse diameters. One axial section positioned generally centrally of the main valve body portion 38 is radially large enough to define a valve chamber 64. In the illustrated valve, the valve chamber 64 is essentially the same diameter as a section of the passage 62 which extends toward one end 42 of the main valve body portion 38. An axially, inwardly extending counterbore, indicated at 66, is provided at that end for a purpose hereinafter discussed. In any event, it will be appreciated that the opening of at least one end of the main body portion 38 is sufficiently enlarged for endwise insertion of the apertured valve member 70 into the valve chamber 64.

The counterbore, indicated at 66, defines an internal shoulder 68 spaced from the first end 42 of the main body portion 38 by a predetermined axial distance. If desired, this structure could be duplicated adjacent the other end 44 of the main body portion 38. However, in the illustrated valve, provision is made for end entry of the valve member 70 at only one end 42 and part of the bifurcated seal carrier structure (described more fully below) is integral with the main body portion 38 at the other end 44.

A stem receiving opening 72, with an axis substantially perpendicular to the longitudinal axis of the longitudinal passage 62 through the main body portion 38, extends laterally through a generally central section of the main body portion 38 into communication with the valve chamber 64. An outwardly projecting collar 76 integral with the main body portion 76 may provide additional lateral support for a valve stem assembly received in the opening 72.

The valve ball 70 positioned within the valve chamber 64 is preferably a thermoplastic ball. The external surface 80 of the valve ball 78 may be essentially entirely spherical, as illustrated, and is preferably spherical at least at the portion adapted to provide a sealing surface. The valve ball 70 is provided with a generally cylindrical central bore 82 having a generally circular cross section (see FIG. 3) and is rotatable about a rotational axis 84 which is substantially perpendicular to the axis 86 of the bore or flow passage 82.

The external surface 80 of the valve ball 78 has a nominal diameter which is less than the nominal diameter of the valve chamber 64. In this manner, the main valve body 38 will not interfere with the valve ball 70 during rotation about the axis 84 between its flow permitting position of FIG. 1 and its flow blocking position of FIG. 4.

A groove 88, which is generally perpendicular to both the ball rotational axis 84 and to the bore axis 86, is provided in the ball 70 at a location where it does not interfere with the sealing portion of the external ball surface 80. The groove 88 may have a dovetail cross-sectional configuration and is adapted to receive a correspondingly configured end portion 90 of a thermoplastic valve stem 92 in a conventional manner. The cylindrical external surface of the valve stem assembly 92 may be provided with an annular groove 96 that receives a suitable conventional O-ring 98. In this manner a fluid seal is effected between the lateral opening 72 and the valve stem 92.

With continued reference to FIG. 1, it will be appreciated that a bifurcated seal carrier assembly 100 is slidably received in the ball entry end of the main valve body portion 38. The bifurcated seal assembly 100 includes an annular thermoplastic seal support member 104 and a thermoplastic back-up member 102.

The back-up member 102 includes a longitudinal bore 106 having a diameter substantially equivalent to the diameter of the valve ball throughbore 82. The seal support member 104 and the seal carried thereby have similarly dimensioned bores. In this manner, the fluid passing through the main valve body portion 38 is substantially unrestricted by the presence of the seal carrier assemblies, the seals and the valve ball 70.

A leading portion 110 of the back-up member has a smaller external diameter and a trailing portion 108 has an enlarged external diameter to define a stepped abutment surface 112. The internal shoulder 68 of the main body portion 38 cooperates with the stepped abutment surface 112 to isolate longitudinal loads on the back-up member 102 from the valve ball 70.

The back-up member 102 is provided with a circumferential groove 118 that receives a peripheral seal member, such as a suitable conventional O-ring 120, to prevent fluid from leaking between the back-up member 102 and the main valve body portion 38. Preferably the O-ring 120 is positioned forward of the shoulder 112 so that fluid pressure in the valve chamber 64 is confined to act only on the smallest annulus area of the back-up member 102.

At the leading end of the reduced section 110 of the back-up member 102 an annular receiving recess 122 for the seal support member 104 is presented. This recess is defined by an axially facing support wall 113 and a radially facing guide wall 114. The annular seal support member 104 includes an axially facing end wall 124 and a radially facing guide wall 125 respectively adjacent the support wall and guide wall of the back-up member 102. The seal support member is, however, dimensioned for limited radial centering movement in the receiving recess 122. Thus, the back-up member 102 provides for axial movement of the seal support member 104 while allowing for radial centering adjustment of the seal support member 104.

An annular retaining groove 126 is disposed in at least one of the axially facing walls 113 and 124 of the seal support member 104 and the back-up member 102 at a location radially inwardly of the radially facing guide walls 114 and 125. In the illustrated valve, the groove 126 is disposed entirely in the axially facing wall 113 of the back-up member 102. An annular, resilient sealing and biasing member 128 is received in the groove 126. The sealing and biasing member provides a fluid seal between the axially facing walls of the back-up member 102 and the seal support member 104. In addition, the sealing and biasing member 128 causes an axial force biasing the seal support member 104 and the seal carried thereby toward the valve ball 70.

Figure 2:
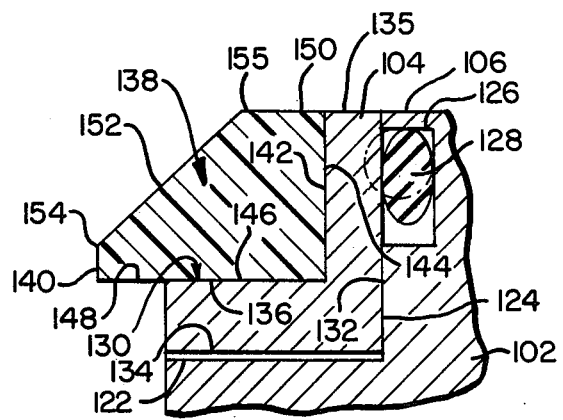
FIG. 2 is an enlarged, partial cross-sectional view illustrating the relationship between the seal support member, the back-up member and the biasing and sealing ring of the valve assembly of FIG. 1.

The sealing and biasing member 128 preferably comprises a suitable conventional O-ring fabricated from "VITON" and having a cross-sectional diameter in its relaxed condition which exceeds the axial depth of the annular groove 126 (see phantom lines of FIG. 2). In this manner, the O-ring is in a compressed state when the seal support member 104 and the back-up member 102 are positioned in the valve assemby 20. Preferably, the O-ring 128, in its relaxed condition, has an internal diameter smaller than the internal diameter of the groove 126 so that it is also received therein in a radially tensioned condition. This enhances the sealing action of the O-ring 128.

The seal support member 104 includes a seal receiving recess 130 facing the valve ball 70. An annular seal member 138 is received therein on the side of the seal support member 104 opposite the axially facing wall 124 on which the biasing ring 128 acts.

As will be appreciated, the axial dimensions of the reduced section 110 and enlarged section 108 of the back-up member 102 and those of the seal support member 104, its receiving recess 122 and the ball seal 138 are preferably such that when the union nut 50 is tightened to produce abutment of the stepped abutment surface 68 and the shoulder 112, the axial faces 113 and 124 of the back-up member 102 and seal support member 104 are in engagement, the ball seal 138 is loaded against the ball 70 at a predetermined acceptable level, and the biasing ring 128 is axially compressed. Should wear of the ball seal 138 occur, the axially compressed biasing ring 128 will act, over a predetermined expected wear range, on the seal support member 104 to urge it axially toward the ball 110 so as to compensate for the wear. The initial compression of the biasing ring 128 is such that over the expected range of ball seal wear, the biasing ring 128 is capable of imposing an acceptably high load in the ball seal 138 against the ball at a level of the order of that imposed by the initial assembly conditions. The same is true over the expected range of loss of seal load attributable to thermal contraction for which the biasing ring 128 may also compensate. However, the load of the ball seal 138 against the ball is prevented from being excessive, whether through assembly forces or thermal expansion, because of the load isolation established through the cooperation of the stepped abutment surface 68 and the shoulder 111.

As previously mentioned, the seal support member 104 is dimensioned to have limited clearance in the receiving recess 122 of the back-up member 104. This clearance permits limited radial movement to allow the ball seal 138 to center itself on the ball 70. Such self-centering action aids in avoiding marring or excessive wear of the ball. Of particular significance in this regard is the fact that the biasing ring 128 is so located that it does not impose direct compressive resistance to this centering movement. As earlier noted, the groove 126 for the biasing ring is disposed radially inwardly of the radially facing guide walls 114 and 125 of the back-up member 102 and seal support member 104. The retaining groove 126 can be located in either or both of the axially facing walls 113, 124 of those members as long as it is arranged so that direct compressive resistance to centering movement is not offered by the biasing ring 128.

The ball seal member 138, usually referred to as a seat, is preferably fabricated from polytetrafluoroethylene to make use of its highly desirable low friction characteristics. As may be seen in FIG. 2, the ball seal 138 includes a relatively narrow, generally radial end face 140. This face 140 faces the valve ball without contacting it. Parallel to and axially spaced from the narrow face 140 is a relatively wide radial end face 142. The relatively wide radial end face 142 may be supported in axial abutment with the axially facing bottom surface 144 of the seal receiving recess 130 defined by the seal support member 104.

The annular seal member 138 has an axial length exceeding the predetermined length of the radially facing sidewall 136 of the seal receiving recess 130. A first, preferably major, portion 146 of the external sidewall of the annular seal member 138 is radially supported in sealing contact with the cylindrical sidewall 136 of the seal receiving recess 130. The leading annular lip portion 148 of the external sidewall of the annular member 138 extends beyond the front end surface 130 of the seal support member 104 and is radially unsupported. In this fashion, the portion of the seal member 138 that projects beyond the seal support member 104 is permitted to deflect radially outwardly.

The internal peripheral surface or sidewall 150 of the seal 138 has a diameter substantially the same as the diameter of the bore 135 through the seal support member 104. A frustoconical surface 152 of the seal member 138 extends from a leading edge 154 common with the narrow front radial surface 140 to an edge 155 common with the internal sidewall 150. It is this frustoconical surface 152 that against which the valve ball is sealed. The frustoconical surface 152 spans at least part of the radially supported portion of the seal as well as the entire radially unsupported portion.

During final assembly (see FIG. 3), the valve ball 70 initially is contacted by the seal member 138 along a contact circle defined by relaxed contact of the frustoconical surface 152, at or adjacent its leading edge 154, with the sealing surface 80 of the ball. A conical surface, tangent to the spherical surface 80 of the ball along that contact circle has a cone half-angle $\theta_t$. As will be appreciated, the cone half-angle $\theta$ of the frustoconical surface 152 is less than the cone angle $\theta_t$ of that tangent cone.

As the union 50, associated with the end connector 28, is tightened, the axial force imparted results in responsive radially outward deflection of the leading, unsupported lip portion of the seal 138 to establish substantial surface contact with the sealing surface of the ball. With the ball 70 oriented in the "closed" position of FIGS. 3 and 4, the ball 70 can move axially relative to the stem 92 by reason of the longitudinally extending orientation of the dovetailed groove 88. Thus, a similar radial outward deflection of the leading unsupported portion of the seal 138' (FIG. 1) on the other side of the ball is induced. At the same time, the ball is substantially centered so that its central transverse axis 84 is brought into alignment with the rotational axis 156 of the stem (compare (FIGS. 3 and 4).

In the final assembled position (FIG. 4), with the unsupported portions of the seals 138 and 138' deflected and in somewhat resilient surface contact with the ball, the ball 70 also makes contact with the radially supported portions of the seals preferably at the juncture with the unsupported portions. By reason of the radial support, cold flow of the seal material is essentially avoided. By reason of the flexure of the radially unsupported lip portions of the seals, potential marring of the ball through edge contact is militated against. Simultaneously, the earlier noted substantial degree of surface contact between the ball and seals is provided. As such, an improved sealing relationship which can withstand a fairly high contact force useful for maintaining the seal is established while the possibility of ball marring is minimized and the expense of conforming the seal surface of the ball surface during manufacture is not encountered.

Figure 3:
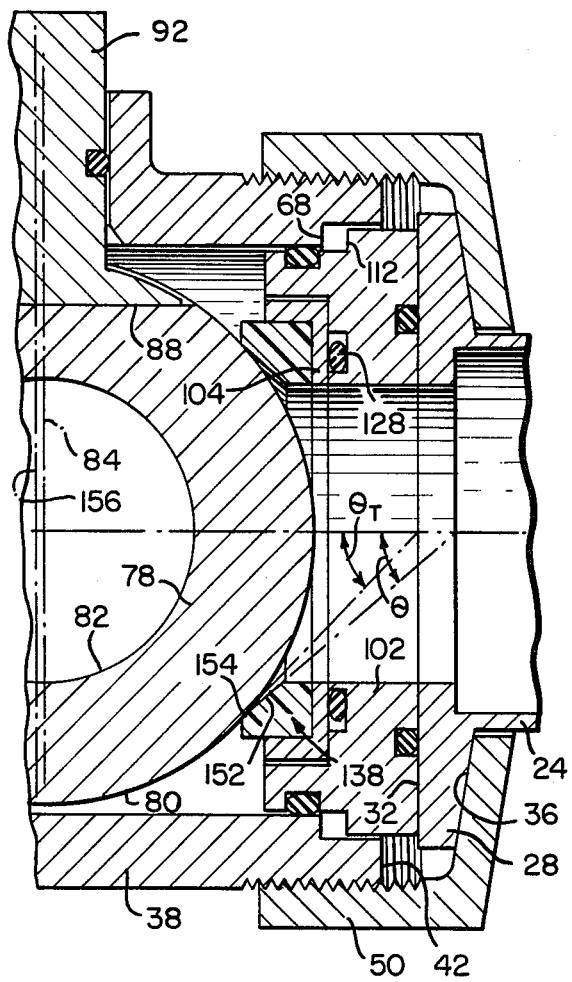
FIG. 3 is a partial longitudinal, cross-sectional view of the valve assembly of FIG. 1 during the final stages of assembly, the ball being depicted in its flow blocking position.
Figure 4:
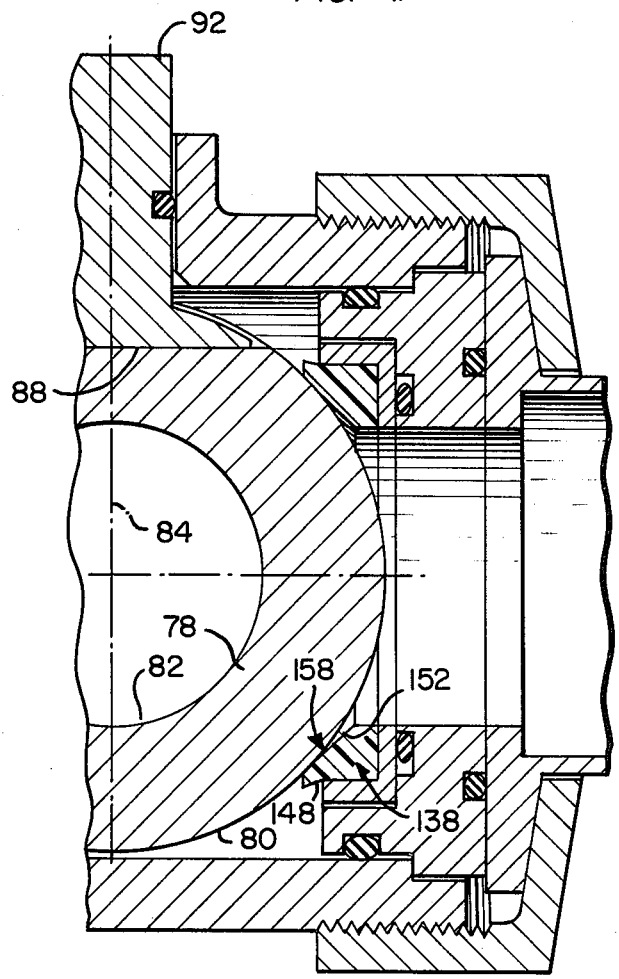
FIG. 4 is a partial longitudinal cross-sectional view similar to FIG. 3, but showing the assembly completed.

In the illustrated valve of FIG. 1, seal adjustment and force isolation is also provided on the side of the ball opposite from that shown in FIGS. 3 and 4. However, the back-up member 102' of the bifurcated seal carrier is integral with the main valve body portion 38 and the valve can thus be conveniently used as a shutoff mechanism at the end of a flowline. Because of the fixed nature of the back-up member, no seal is required between that back-up member 102' and the main body portion as in the case of the O-ring seal 120 between the back-up member 102 and the main body portion at the other end of the valve.

The seal support member 104' associated with the fixed back-up member 102' is identical in structure to the seal support member 104 associated with the movable back-up member 102, so it need not be described in detail. The same is true of the associated biasing O-ring 128' and the valve ball seal 138' which correspond to the similarly numbered members already described in connection with the entry end of the valve.

It will, however, be apparent that many advantages of the present invention can be realized without incorporating such structure at the "closed" (i.e. nonentry end) of the valve. It will also be apparent that provision may be made for valve ball entry at the second end, either with or without structure duplicating that described in connection with the entry end (i.e., with or without provision for seal adjustment and centering, etc. according to the present invention). Moreover, although the illustrated valve is of the dropout type where the valving section can be removed or inserted without disturbing the associated pipe ends (not shown), it will be appreciated that this need not be the case, and the present invention embraces a situation where the end connectors are integral with the back-up members of the bifurcated seal carrier at either or both ends of the valve. In such instances, of course, the illustrated seals 162 located in grooves at the outer ends of the back-up members would not be employed. Other variations are also envisioned.

Figure 5:
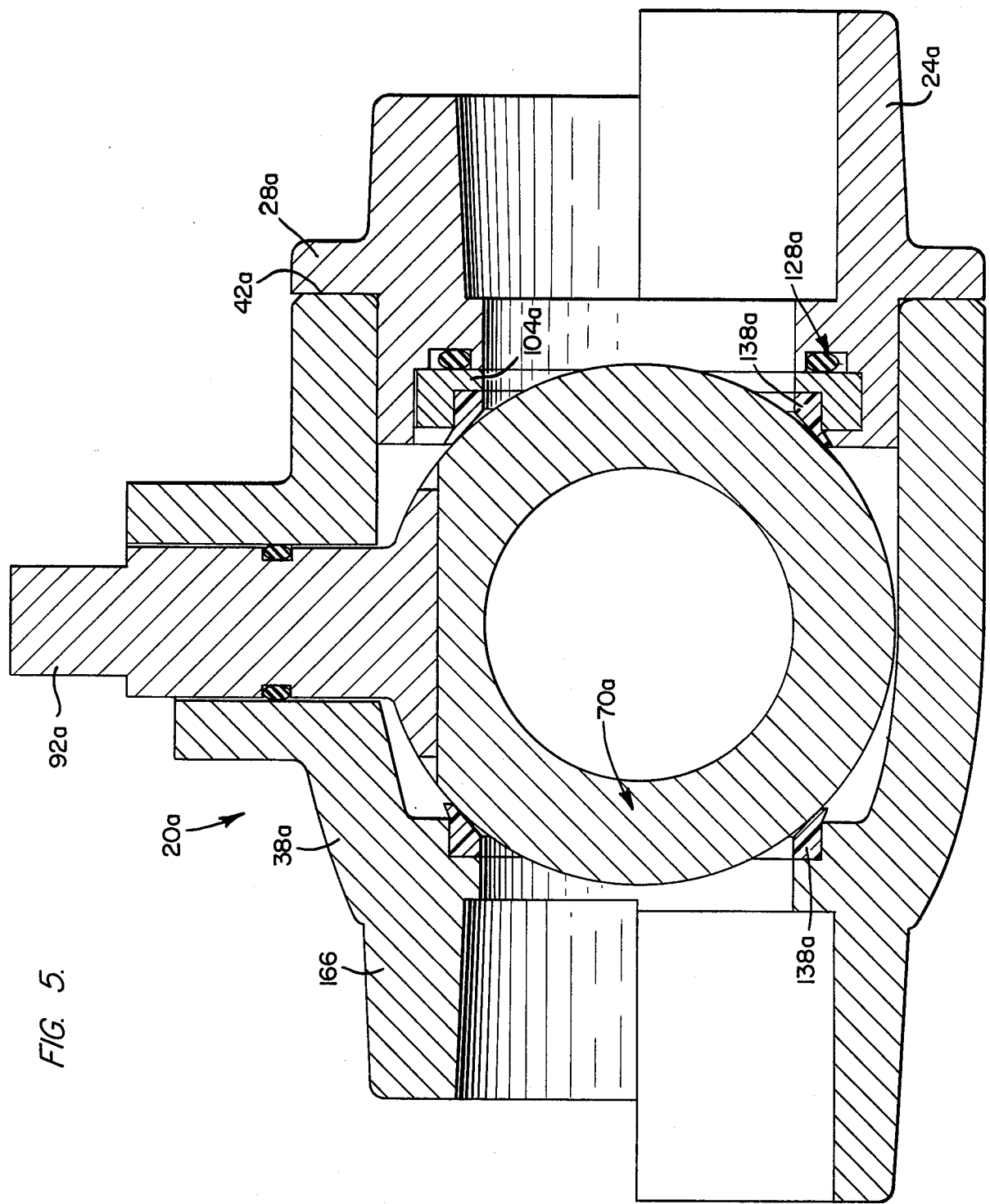
FIG. 5 is a longitudinal cross-sectional view of another thermoplastic ball valve assembly according to the present invention.

Turning now to FIG. 5, a further embodiment of a thermoplastic end entry ball valve assembly 20a according to the present invention will be seen. In that embodiment the end connector 166 at one end of the valve is integral with the main valve body 38a, and no provision is made for compensating for adjustment of the ball seal 138a at that end.

At the other end, the end connector 24a is integral with the back-up member 102a of the bifurcated seal carrier. The back-up member 102a has an external diameter substantially equal to the internal diameter of the entry opening in the main body 38a of the valve at that end, and neither are stepped as in the embodiment of FIG. 1. Force isolation is provided by the abutment of an enlarged flange 28a of the end connector with the end wall 42a of the main valve body. The end connector is permanently fixed in any suitable manner, such as by solvent, vibration or heat welding, to the main valve body at that location, which, of course, will preclude further access to the interior.

The ball 70a, stem 92a, seal support member 104a, the seal 138a carried thereby, and the biasing O-ring 128a function as the correspondingly numbered members described in connection with FIG. 1.

Although the invention has been described in conjunction with preferred forms thereof, it will be appreciated by those skilled in the art that additions, deletions, substitutions and modifications not specifically described may be made without departing from the spirit and scope of the invention as defined in the appended claims.

What is claimed is:

1. An end entry ball valve assembly comprising:
   valve body means presenting first and second open ends and operable to be connected in fluid communicating relationship to conduit means;
   said valve body means including a valve chamber between said first and second ends and a stem receiving passage communicating with said valve chamber;

valve ball means positioned in said valve chamber and operable to rotate between a flow permitting position and a flow blocking position therein;

stem means extending through said stem receiving passage and engageable with said valve ball means to rotate said valve ball means between said flow permitting and flow blocking positions;

the opening of at least one end of said valve body means being sufficiently enlarged for insertion of said valve ball means into said valve chamber;

bifurcated seal carrier means received in said at least one end of said valve body means and including an annular seal support member and a back-up member;

said annular seal support member carrying an annular seal engaged with said valve ball member and including an axially facing wall and a radially facing guide wall;

said back-up member being slidably receivable in said opening of said at least one end of said valve body means and presenting a seal support member receiving recess defined by an axially facing wall adjacent said axially facing wall of said seal support member and a radially facing guide wall adjacent said radially facing guide wall of said seal support member;

means defining an annular retaining groove disposed in at least one of said axially facing walls and located radially inwardly from said radially facing guide walls of said seal support member and said back-up member;

annular, resilient biasing and sealing means, disposed in said groove in axially compressed condition, for generally axially biasing said seal support member and the seal carried thereby toward said valve ball means and for sealing against flow between said axially facing walls of said annular seal support member and said back-up member; and the radial dimension of said radially facing wall of said receiving recess being greater than the outer radial dimension of said seal support member to define limited radial clearance therebetween providing for limited radial centering movement of said seal support member in said receiving recess without direct compressive resistance by said resilient biasing and sealing means.

2. The end entry ball valve assembly of claim 1 wherein:
said back-up member includes a leading portion of smaller external diameter and a trailing portion of enlarged external diameter to define a stepped abutment surface; and
the opening of said at least one end of said valve body means presents an internal shoulder cooperable with said stepped abutment surface to isolate longitudinal loads on said back-up member from said valve ball means.

3. The end entry ball valve assembly of claim 1 wherein:
said back-up member is integral with an end connector operable to couple the ball valve assembly to a conduit at said at least one end of said valve body means; and
said end connector includes a radially extending flange engageable with an abutment surface presented by said one end of said valve body means to isolate longitudinal loads on said back-up member from said valve ball means.

4. The end entry ball valve assembly of claim 1 including:
second bifurcated seal carrier means adjacent the other end of said valve body means and including a second annular seal support member and a second back-up member;
said second annular seal support member carrying a second annular seal engaged with said valve ball member
and including an axially facing wall and a radially facing guide wall;
said second back-up member presenting a second seal support member receiving recess defined by an axially facing wall adjacent said axially facing wall of said second seal support member and a radially facing guide wall adjacent said radially facing guide wall of said second support member;
a second annular retaining groove disposed in at least one of said axially facing walls and located radially inwardly from said radially facing guide walls of said second seal support member and said second back-up member;
second annular, resilient biasing and sealing means disposed in said second retaining groove in axially compressed condition, for generally axially biasing said second seal support member and the second seal carried thereby toward said valve ball means and for sealing against flow between said axially facing walls of said second annular seal support member and said back-up member;
said second seal support member being dimensioned for limited radial centering movement in said receiving recess without direct compressive resistance by said resilient biasing and sealing means.

5. The end entry ball valve assembly of claim 1 wherein:
said annular, resilient biasing and sealing means, in its relaxed condition, has an internal diameter smaller than the internal diameter of said groove and is received therein in tensioned condition.

6. An end entry ball valve assembly comprising:
thermoplastic valve body means presenting first and second open ends and operable to be connected in fluid communicating relationship to conduit means;
said valve body means including a valve chamber between said first and second ends and a stem receiving passage communicating with said valve chamber;
thermoplastic valve ball means positioned in said valve chamber and operable to rotate between a flow permitting position and a flow blocking position therein;
thermoplastic stem means extending through said stem receiving passage and engageable with said valve ball means to rotate said valve ball means between said flow permitting and flow blocking positions;
the opening of at least one end of said valve body means being sufficiently enlarged for insertion of said valve ball means into said valve chamber;
thermoplastic bifurcated seal carrier means received in said at least one end of said valve body means and including an annular seal support member and a back-up member;
end connector means operable to couple the ball valve assembly to a conduit at said at least one end of said valve body means and operable to transmit longitudinal loads to said back-up member;

said annular seal support member carrying an annular thermoplastic seal engaged with said valve ball member and including an axially facing wall and a radially facing guide wall;

said back-up member being slidably receivable in said opening of said at least one end of said valve body means and presenting a seal support member receiving recess defined by an axially facing wall adjacent said axially facing wall of said seal support member and a radially facing guide wall adjacent said radially facing guide wall of said seal support member;

means defining an annular retaining groove disposed in at least one of said axially facing walls and located radially inwardly from said radially facing guide walls of said seal support member and said back-up member;

annular, resilient biasing and sealing means disposed in said groove in axially compressed condition, for generally axially biasing said seal support member and the seal carried thereby toward seat valve ball means and for sealing against flow between said axially facing walls of said annular seal support member and said backup member;

said annular, resilient biasing and sealing means, in its relaxed condition, having an internal diameter smaller than the internal diameter of said groove and being received therein in tensioned condition;

the radial dimension of said radially facing wall of said receiving recess being greater than the outer radial dimension of said seal support member to define limited radial clearance therebetween providing for limited radial centering movement of said seal support member in said receiving recess without direct compressive resistance by said resilient biasing means.

7. The end entry ball valve assembly of claim 6 wherein said end connector means and said back-up member are integral.

8. The end entry valve assembly of claim 6 including:

second bifurcated seal carrier means adjacent the other end of said valve body means and including a second annular seal support member and a second back-up member;

said second annular seal support member carrying a second annular seal engaged with said valve ball member and including an axially facing wall and a radially facing guide wall;

said second back-up member presenting a second seal support member receiving recess defined by an axially facing wall adjacent said axially facing wall of said second seal support member and a radially facing guide wall adjacent said radially facing guide wall of said second support member;

a second annular retaining groove disposed in at least one of said axially facing walls and located radially inwardly from said radially facing guide walls of said second seal support member and said second back-up member;

second annular, resilient biasing and sealing means disposed in said second retaining groove in axially compressed condition, for generally axially biasing said second seal support member and the second seal carried thereby toward said valve ball means and for sealing against flow between said axially facing walls of said second annular seal support member and said back-up member;

said second seal support member being dimensioned for limited radial centering movement in said receiving recess without direct compressive resistance by said resilient biasing and sealing means.

* * * * *